(12) United States Patent
Son et al.

(10) Patent No.: US 12,549,689 B2
(45) Date of Patent: Feb. 10, 2026

(54) VIDEO RECEPTION/SEARCH APPARATUS AND VIDEO DISPLAY METHOD

(71) Applicant: Hanwha Vision Co., Ltd., Seongnam-si (KR)

(72) Inventors: Chung Jin Son, Seongnam-si (KR); Young In Yun, Seongnam-si (KR); Ho Jung Lee, Seongnam-si (KR); Dong Won Kim, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/666,467

(22) Filed: May 16, 2024

(65) Prior Publication Data

US 2024/0305750 A1  Sep. 12, 2024

Related U.S. Application Data

(63) Continuation of application No. PCT/KR2022/020716, filed on Dec. 19, 2022.

(30) Foreign Application Priority Data

Dec. 31, 2021  (KR) .......................... 10-2021-019371

(51) Int. Cl.
*G06F 3/0481* (2022.01)
*G06V 10/94* (2022.01)
(Continued)

(52) U.S. Cl.
CPC ........... *H04N 7/183* (2013.01); *G06V 10/945* (2022.01); *G06V 20/44* (2022.01); *G06V 20/52* (2022.01); *H04N 5/265* (2013.01)

(58) Field of Classification Search
CPC .......... H04N 7/183; H04N 5/265; H04N 5/77; H04N 7/18; H04N 21/43; H04N 21/431;
(Continued)

(56) References Cited

U.S. PATENT DOCUMENTS

| 2005/0257169 A1* | 11/2005 | Tu | G06F 3/0481 |
| | | | 715/810 |
| 2013/0091432 A1* | 4/2013 | Shet | G06F 16/73 |
| | | | 715/719 |

(Continued)

FOREIGN PATENT DOCUMENTS

| JP | 2021-129216 A | 9/2021 |
| KR | 10-1960667 B1 | 7/2019 |
| WO | 2021/053689 A1 | 3/2021 |

*Primary Examiner* — Howard D Brown, Jr.
(74) *Attorney, Agent, or Firm* — Sughrue Mion, PLLC

(57) ABSTRACT

A video processing system including: at least one camera configured to obtain video data; a display interface; and a video analyzer including a memory storing instructions, and a processor configured to execute the instructions to: receive a video data from at least one camera; identify a plurality of video frames in which events occur from the received video data; generate a plurality of thumbnail images respectively representing the plurality of video frames; display a timeline interface indicating respective times of the events via a plurality of markers; and provide the plurality of thumbnail images in a thumbnail area adjacent to the timeline interface respectively corresponding with the plurality of markers, where left ends of the plurality of markers indicate start times of the events, and left ends of the plurality of thumbnail images coincide with the left ends of the plurality of markers.

20 Claims, 11 Drawing Sheets

(51) Int. Cl.
*G06V 20/40* (2022.01)
*G06V 20/52* (2022.01)
*H04N 5/265* (2006.01)
*H04N 7/18* (2006.01)

(58) Field of Classification Search
CPC .............. H04N 21/472; H04N 21/845; H04N 21/8549; H04N 23/60; H04N 21/4302; H04N 21/4316; H04N 21/8456; G06V 10/945; G06V 20/44; G06V 20/52; G06F 16/738; G06F 16/739
See application file for complete search history.

(56) References Cited

U.S. PATENT DOCUMENTS

| | | | |
|---|---|---|---|
| 2017/0062014 A1* | 3/2017 | Liu ........................ | G11B 27/34 |
| 2017/0294213 A1* | 10/2017 | Brauckmann ....... | G06F 16/7844 |
| 2021/0098026 A1* | 4/2021 | Bedi .................... | G06V 10/462 |
| 2021/0133456 A1* | 5/2021 | Lee ....................... | G06F 18/21 |
| 2023/0093631 A1* | 3/2023 | Kim .................... | H04N 21/235 |
| | | | 348/159 |
| 2024/0305750 A1* | 9/2024 | Son ...................... | H04N 21/431 |

* cited by examiner

VIDEO RECEPTION/SEARCH APPARATUS AND VIDEO DISPLAY METHOD

CROSS-REFERENCE TO RELATED APPLICATION(S)

This application is a continuation of International Application No. PCT/KR2022/020716, filed on Dec. 19, 2022, in the Korean Intellectual Property Receiving Office, which is based on and claims priority to Korean Patent Application No. 10-2021-0194371, filed on Dec. 31, 2021, in the Korean Intellectual Property Office, the disclosures of which are incorporated by reference herein in their entireties.

BACKGROUND

1. Field

This disclosure relates to a network surveillance camera system, and more particularly, to a video reception/search apparatus that displays thumbnail images corresponding to event highlights of received videos for each channel at unequal intervals on a timeline of a video search viewer displaying the received videos for each channel, and a network surveillance camera system including the same.

2. Description of Related Art

Recent surveillance camera systems may transmit various video analysis information acquired in surveillance areas together with video and audio signals by utilizing network cameras.

The network-based surveillance camera system may include a network surveillance camera and a video reception apparatus such as a digital video recorder (DVR) or a network video recorder (NVR) that receives information from the network surveillance camera through a media streaming method using a real-time transfer protocol (RTP)/real time streaming protocol (RTSP). In this case, the information transmission method has adopted a standard protocol through a video surveillance standardization organization such as open network video interface forum (ONVIF), and the RTSP is a standard communication protocol (RFC2326) developed by Internet engineering task force (IETF), and may be used to remotely control a media server. In order to transmit media streaming data including an actual video and audio, the RTP may be mainly used as a transport layer.

An existing network-based surveillance camera system may confirm videos for each channel captured from respective surveillance cameras through a display of a video reception apparatus. However, this has a problem that a an interface is divided for each channel and fails to indicate which channel among multiple divided channels has a high occurrence frequency of events.

In addition, a timeline interface may be displayed on the display of the video reception apparatus in order to provide convenience in video search, but an existing timeline interface has been utilized only in terms of selecting or adjusting reproduction points in time of videos for each channel received by the video reception apparatus. In other words, the existing network-based surveillance system does not support efficient searching throughout the plurality of channels for a specific event.

SUMMARY

By contrast, this disclosure improves the existing systems. Provided is a method and system which analyzes whether or not events have occurred, an occurrence frequency of events, occurrence times of the events for each of a plurality of channels collectively, and the like, and displays thumbnail images for video frames in which the events have occurred synchronously with a timeline interface.

Further provided is a method and a system which receives video data and metadata, and allows for the search among a plurality of channels for a specific event based on a user input.

Further provided is a method and system which recognizes an occurrence time of an event only by a position of a thumbnail image representing a video frame in which the event has occurred by displaying the thumbnail image on the basis of an occurrence time of the event.

Further provided is a system and a method configured to display a plurality of thumbnail images on a thumbnail area in a more efficient and systematic manner by processing the plurality of thumbnail images when it is not sufficient to display all of the plurality of thumbnail images in the thumbnail area.

Additional aspects will be set forth in part in the description which follows and, in part, will be apparent from the description, or may be learned by practice of the presented embodiments.

According to an aspect of the disclosure, provided is a video display method performed by a processor and a memory storing instructions executable by the processor, the video display method may include: receiving video data from at least one camera; identifying a plurality of video frames in which events occur from the received video data; generating a plurality of thumbnail images respectively representing the plurality of video frames; displaying a timeline interface indicating respective times of the events via a plurality of markers; and providing the plurality of thumbnail images in a thumbnail area adjacent to the timeline interface respectively corresponding with the plurality of markers, wherein left ends of the plurality of markers indicate start times of the events, and left ends of the plurality of thumbnail images coincide with the left ends of the plurality of markers.

A marker which does not overlap another marker may indicate a start time and an end time of an event, where a marker which overlaps another marker indicates a start time.

The thumbnail area may include scroll indicators at a left end and a right end configured to display thumbnail images from different time zones than thumbnail images that are displayed in the thumbnail area.

Based on multiple thumbnail images overlapping in the thumbnail area, a thumbnail image captured later in time may be displayed in front of a thumbnail image captured earlier in time.

The method may further include receiving a user command which selects a thumbnail image among the plurality of thumbnail images displayed in the thumbnail area; and displaying the selected thumbnail image in the thumbnail area.

The selected thumbnail image may be distinguished from the plurality of thumbnail images.

The user command may include a selection of one or more thumbnail images by a user, and the one or more thumbnail images selected by the user are displayed in the thumbnail area, and a left end of the one or more selected thumbnail images are displayed to coincide with a left end of a marker corresponding to the thumbnail image.

The user command may include an event search among the video data, and one or more thumbnail images corresponding to the event search among the plurality of thumbnail images may be displayed in the thumbnail area, where a left end of the one or more thumbnail images coincides with left ends of one or more markers corresponding to the one or more thumbnail images.

The providing the plurality of thumbnail images in the thumbnail area may include: cropping partial images from the plurality of thumbnail images; and generating a composite image by integrating the partial images and providing the composite image in the thumbnail area.

The plurality of thumbnail images provided in the thumbnail area may have a same size in a transverse direction and are provided in an order based on time.

The method may further include: receiving a user command; cropping partial images based on one or more objects included in the plurality of thumbnail images according to the user command; and displaying the partial images as the plurality of thumbnail images in the thumbnail area.

The partial images may respectively correspond with the plurality of markers.

The plurality of thumbnail images may be displayed in a carousel form on a left and a right of a thumbnail image provided in the thumbnail area.

The method may further include: receiving a user command selecting a partial area of the thumbnail area; and displaying thumbnail images included in the selected partial area in the thumbnail area.

Based on the thumbnail images included in the selected partial area, one or more thumbnail images may be displayed as uncropped images and one or more thumbnail images are displayed as cropped images.

According to an aspect of the disclosure, a video processing system may include: at least one camera configured to obtain video data; a display interface, and a video analyzer including a memory storing instructions, and a processor configured to execute the instructions to: receive video data from the at least one camera; identify a plurality of video frames in which events occur from the received video data; generate a plurality of thumbnail images respectively representing the plurality of video frames; display a timeline interface indicating respective times of the events via a plurality of markers; and provide the plurality of thumbnail images in a thumbnail area adjacent to the timeline interface respectively corresponding with the plurality of markers, where left ends of the plurality of markers indicate start times of the events, and left ends of the plurality of thumbnail images coincide with the left ends of the plurality of markers.

The thumbnail area may include scroll indicators at respective ends configured to display thumbnail images from different time zones than a plurality of thumbnail images that are displayed in the thumbnail area.

The processor may be further configured to: receive a user command which selects a thumbnail image among the plurality of thumbnail images displayed in the thumbnail area; and display the selected thumbnail image in the thumbnail area.

The processor may be further configured to: crop partial images based on one or more objects included in the plurality of thumbnail images based on the video data; and display the partial images as the plurality of thumbnail images in the thumbnail area.

The video data may include video information and associated metadata, where the video information includes a plurality of video frames, and where the associated metadata includes: object detection information; object tracking information; object position information; and time information.

The processor may be further configured to: receive a user command which selects a thumbnail image among the plurality of thumbnail images displayed in the thumbnail area; and display the selected thumbnail image in the thumbnail area, where the user command is an event search among the video data, and one or more thumbnail images corresponding to the event search among the plurality of thumbnail images are displayed in the thumbnail area.

According to an aspect of the disclosure, provided is a non-transitory computer-readable information storage medium for storing a program which may cause a computer to: receive video data from the at least one camera; identify a plurality of video frames in which events occur from the received video data; generate a plurality of thumbnail images respectively representing the plurality of video frames; display a timeline interface indicating respective times of the events via a plurality of markers; and provide the plurality of thumbnail images in a thumbnail area adjacent to the timeline interface respectively corresponding with the plurality of markers, where left ends of the plurality of markers indicate start times of the events, and left ends of the plurality of thumbnail images coincide with the left ends of the plurality of markers.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
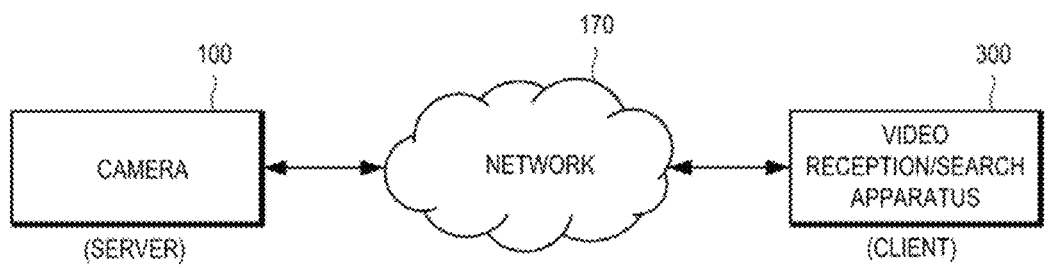
FIG. 1 is a schematic block diagram illustrating a configuration of a network surveillance camera system according to an embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

FIG. 1 is a schematic block diagram illustrating a configuration of a network surveillance camera system according to an embodiment of the present disclosure.

Referring to FIG. 1, the network surveillance camera system according to an embodiment of the present disclosure may include a camera 100, a network 170, and a video reception/search apparatus 300. In the network surveillance camera system, video information acquired from the camera 100 may be transmitted to the video reception/search apparatus 300 (e.g., a video analyzer) through the network 170, and a manager may perform a search for the transmitted multi-channel video information using the video reception/search apparatus 300. That is, in an embodiment of the present disclosure, the camera 100 may serve as a server transmitting data, and the video reception/search apparatus 300 may serve as a client receiving the transmitted data.

The camera 100 obtains video and audio signals for a surveillance area by capturing the surveillance area, and may capture the surveillance area in real time for surveillance or security purposes. In an embodiment of the present disclosure, a plurality of cameras 100 may be implemented, through which a plurality of surveillance areas may acquire video information for each surveillance area, and the acquired video information for each surveillance area may be transmitted to each channel. In other words, in an embodiment of the present disclosure, the plurality of cameras 100 may be implemented to perform an operation of acquiring video information such as video signals for each surveillance area. That is, the plurality of cameras 100 may perform an operation of generating and transmitting multi-channel video signals corresponding to their respective surveillance areas, respectively.

The camera 100 may be implemented as a pan, tilt, and zoom camera (PTZ camera) which is capable of panning and tilting and in which a zoom magnification of a lens is adjustable. The camera 100 may be implemented as a network camera that performs an intelligent video analysis function.

As an example, the camera 100 according to an embodiment of the present disclosure may generate and transmit video analysis information on video information in the form of metadata, in addition to the video information including the video signal corresponding to the surveillance area. The metadata may not only be created in a text format, but may also be implemented in various forms that may be interpreted by a system. As an example, the metadata may be implemented in a text format having a rule such as extensible markup language (XML) or JavaScript Object Notation (JSON), or in a binary form defined by its own protocol.

The metadata may include object detection information (movement, sound, intrusion into a designated zone, etc.), object identification information (a person, a vehicle, a face, a hat, clothes, etc.), unique identifier information of an object for object tracking, position information (coordinates, a size, etc.) of the detected object, and time information, captured in the surveillance area. Such metadata may be transmitted to the video reception/search apparatus 300 through the network 170 in real time together with the video and audio signals detected in the surveillance area and be used to increase control convenience and search efficiency during real-time control and video search.

According to an embodiment, the camera 100 may be a network camera that generates a video analysis signal by performing the intelligent video analysis function, but an operation of the network surveillance camera system is not necessarily limited thereto. As an example, the camera 100 may transmit video information corresponding to each surveillance area, and the video reception/search apparatus 300 that receives the video information may analyze the video information and generate video analysis information on the video information.

The camera 100 according to an embodiment of the present disclosure may capture a video frame for a specific analysis area among the video analysis information together with generating the metadata, and transmit the video frame in real time. As an example, the video frame may be implemented as a joint photographic experts group (JPEG) image file.

The camera 100 may transmit information to the video reception/search apparatus 300 or receive an instruction from the video reception/search apparatus 300, using various wired and wireless communication methods such as Ethernet, wireless fidelity (Wi-Fi), and Bluetooth.

The network 170 may include, for example, wired networks such as local area networks (LANs), wide area networks (WANs), metropolitan area networks (MANs), and integrated service digital networks (ISDNs) or wireless networks such as wireless LANs, code division multiple access (CDMA), Bluetooth, and satellite communication, but the scope of the present disclosure is not limited thereto.

The video reception/search apparatus 300 may receive and store the video information for each channel transmitted from the cameras 100, and may perform an operation of analyzing and monitoring the video information.

The video reception/search apparatus 300 may be illustrated and described as a single block, but a configuration and an operation of the video reception/search apparatus 300 according to an embodiment of the present disclosure are not limited thereto.

The video reception/search apparatus 300 may implement a function of a video reception apparatus that receives and stores the data transmitted from the camera 100 and a function of a video search apparatus that performs analysis and monitoring operations on the data. In this case, the video reception apparatus and the video search apparatus may be configured to be physically separated from each other or may be implemented together through one server system.

For example, the video reception apparatus 300 may be implemented as a digital video recorder (DVR), a network video recorder (NVR), a video management system (VMS), or the like, and the video search apparatus may be implemented as a separate device or application software performing a function of searching for and analyzing camera video data stored in the video reception apparatus. Accordingly, the manager may perform a search for the transmitted multi-channel video information using the video reception/search apparatus 300.

In an embodiment of the present disclosure, a search for the multi-channel video information may be performed using a video search viewer provided by the video reception/search apparatus 300, and an embodiment of a graphic user interface (GUI) provided by the video search viewer will be described in more detail later with reference to FIGS. 6 to 13.

Figure 2:
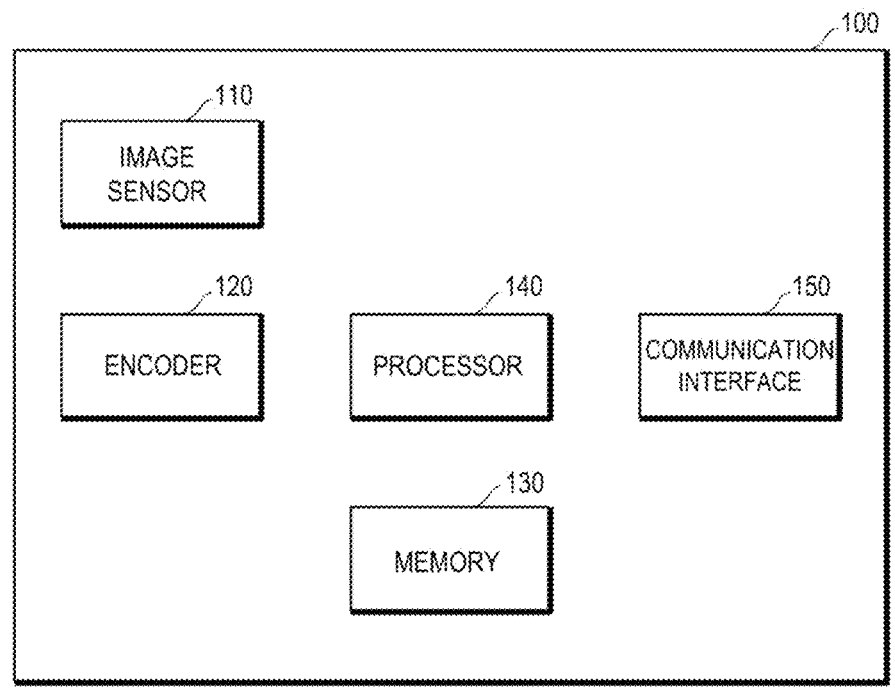
FIG. 2 is a block diagram illustrating a configuration of a camera illustrated in FIG. 1 according to an embodiment of the present disclosure.
Figure 3:
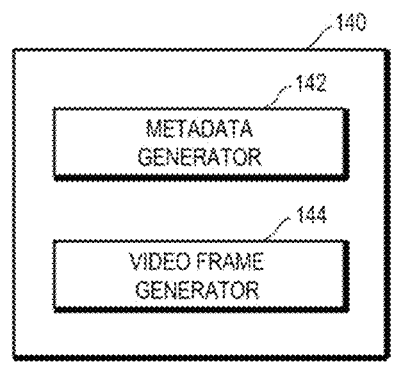
FIG. 3 is a block diagram illustrating an embodiment of an internal configuration of a processor illustrated in FIG. 2.

FIG. 2 is a block diagram illustrating a configuration of a camera illustrated in FIG. 1, and FIG. 3 is a block diagram illustrating an embodiment of an internal configuration of a processor illustrated in FIG. 2. It will be described by way of example that the camera 100 illustrated in FIGS. 2 and 3 is the network camera that generates the video analysis signal by performing the intelligent video analysis function as described above, but an operation of the network surveillance camera system according to an embodiment of the present disclosure is not necessarily limited thereto.

First, referring to FIG. 2, the camera 100 may include an image sensor 110, an encoder 120, a memory 130, a processor 140, and a communication interface 150.

The image sensor 110 may perform a function of obtaining a video by capturing a surveillance area, and may be implemented as, for example, a charge coupled device (CCD) sensor, a complementary metal oxide semiconductor (CMOS) sensor, or the like.

The encoder 120 may perform an operation of encoding the video obtained through the image sensor 110 into a digital signal, and follow, for example, H.264, H.265, moving picture experts group (MPEG), motion joint photographic experts group (M-JPEG) standards, and the like.

The memory 130 may store video data, audio data, a video frame, metadata, and the like. As described above, the metadata may include object detection information (movement, sound, intrusion into a designated zone, etc.), object identification information (a person, a vehicle, a face, a hat, clothes, etc.), and position information (coordinates, a size, etc.) of the detected object, captured in the surveillance area.

In addition, the video frame may be generated together with the metadata and stored in the memory 130, and may be generated by capturing image information for a specific analysis area among the video analysis information. As an example, the video frame may be implemented as a JPEG image file.

As an example, the video frame may be generated by cropping a specific area of video data determined to be an identifiable object among video data of the surveillance area detected in a specific area during a specific period, and may be transmitted in real time together with the metadata.

The communication interface 150 may transmit the video data, the audio data, the video frame, and/or the metadata to the video reception/search apparatus 300. The communication interface 150 according to an embodiment may transmit the video data, the audio data, the video frame, and/or the metadata to the video reception/search apparatus 300 in real time. The communication interface 150 may perform at least one communication function of wired and wireless LANs, Wi-Fi, ZigBee, Bluetooth, and near field communication.

The processor 140 may control an overall operation of the camera 100, and may be configured to process an instruction of a computer program by performing basic arithmetic, logic, and input/output operations. The instruction may be provided to the processor 140 by the memory 130 or the communication interface 150. As an example, the processor 140 may be configured to execute a received instruction according to a program code stored in a recording device such as the memory 130. That is, the processor 140 may include a program module implemented using C, C++, Java, Visual Basic, Visual C, or the like, in terms of software and performing various functions.

Referring to FIG. 3, the processor 140 of the network camera 100 according to an embodiment of the present disclosure may include a metadata generator 142 and a video frame generator 144.

The processor 140 may be implemented to execute an instruction according to a code of an operating system and at least one program code included in the memory 130. In this case, components within the processor 140, that is, the metadata generator 142 and the video frame generator 144, may express different functions performed by the processor 140 based on a control instruction provided by a program code stored in the memory 130 of the camera 100.

The metadata generator 142 may perform a function of generating video analysis information corresponding to a surveillance area of each camera in the form of metadata. The metadata may include object detection information (movement, sound, intrusion into a designated zone, etc.), object identification information (a person, a vehicle, a face, a hat, clothes, etc.), unique identifier information of an object for object tracking, position information (coordinates, a size, etc.) of the detected object, and time information, captured in the surveillance area, and such metadata may be transmitted to the video reception/search apparatus 300 through the network 170 in real time together with the video and audio signals detected in the surveillance area and be used to increase control convenience and search efficiency during real-time control and video search.

The processor 140 of the camera 100 according to an embodiment of the present disclosure may capture and generate a video frame for a specific analysis area among the video analysis information through the video frame generator 144 together with generating the metadata, and the video frame generated through the video frame generator 144 may be stored in the memory 130.

As an example, the video frame may be generated by cropping a specific area of video data determined to be an identifiable object among the video data of the surveillance area detected in a specific area and during a specific period.

The video frame may be a video frame generated by cropping a specific area, that is, a video portion corresponding to an identifiable object detected within the surveillance area, among the video analysis information corresponding to the surveillance area, created as the metadata.

That is, a "best shot" video frame that may best recognize a specific object among the video data captured in the surveillance area may be selected, and may be transmitted in real time together with the metadata. Accordingly, the client, such as the video reception/search apparatus 300, may utilize the video frame as a thumbnail image when searching for the transmitted video data without performing separate video processing such as decoding.

Figure 4:
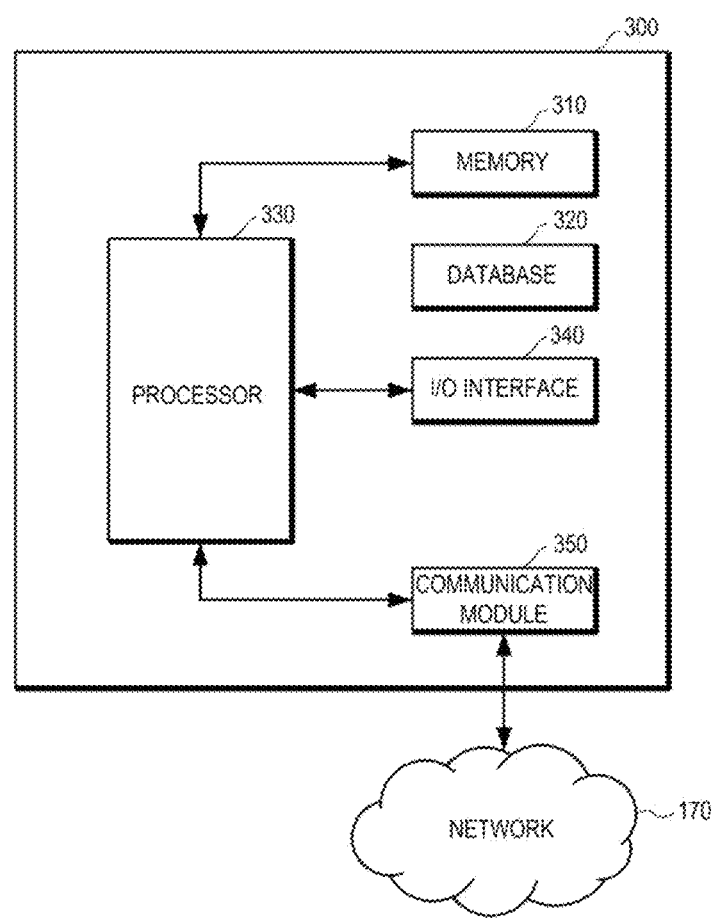
FIG. 4 is a block diagram illustrating a configuration of a video reception/search apparatus illustrated in FIG. 1 according to an embodiment of the present disclosure.
Figure 5:
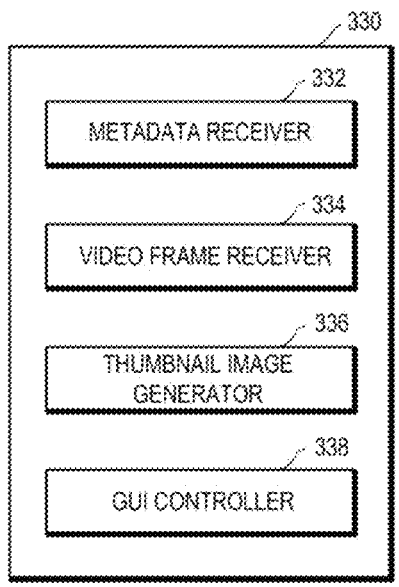
FIG. 5 is a block diagram illustrating an internal configuration of a processor illustrated in FIG. 4 according to an embodiment of the present disclosure.

FIG. 4 is a block diagram illustrating a configuration of a video reception/search apparatus illustrated in FIG. 1, and FIG. 5 is a block diagram illustrating an embodiment of an internal configuration of a processor illustrated in FIG. 4.

The video reception/search apparatus 300 may serve as a client that receives and stores data transmitted from the camera 100, and analyzes and monitors the data. As an example, the video reception/search apparatus 300 may implement a video reception function of receiving multi-channel video information from the cameras 100 and a video search function of performing an analysis and a search for the received multi-channel video information, and in particular, the video search function may be operated by installing an application program (video search viewer) capable of implementing the video search function on a server system constituting the video reception apparatus. However, this is an example, and as described above, the video reception/search apparatus 300 may be implemented to be separated into the video reception apparatus and the video search apparatus.

Video search viewers as illustrated in FIG. 6 to FIG. 13 may be provided through an application program performing the video search function, and accordingly, the manager may perform a search for the transmitted multi-channel video information using the video reception/search apparatus 300.

First, referring to FIG. 4, the video reception/search apparatus 300 according to an embodiment of the present disclosure may include a memory 310, a database 320, a processor 330, a communication interface 350, and an input/output interface 340.

The memory 310 may be a computer-readable recording medium, and may include a non-volatile large-capacity recording device such as a random access memory (RAM), a read only memory (ROM), and a disk drive. The memory 310 may store the signals transmitted from the camera 100 illustrated in FIG. 1, such as the video data, the audio data, the video frame, and the metadata corresponding to the surveillance area of the camera.

The database 320 may store and maintain unique information (e.g., a camera ID, etc.) of the camera 100 illustrated in FIG. 1. That is, when surveillance cameras connected to the video reception/search apparatus 300 are added and/or changed, information corresponding to the added and/or changed surveillance cameras may also be updated in the database 320.

The processor 330 may be configured to process an instruction of a computer program by performing basic arithmetic, logic, and input/output operations. The instruction may be provided to the processor 330 by the memory 310 or the communication interface 350. As an example, the processor 330 may be configured to execute a received instruction according to a program code stored in a recording device such as the memory 310. That is, the processor 330 may include a program module implemented using C, C++, Java, Visual Basic, Visual C, or the like, in terms of software and performing various functions.

The communication interface 350 may provide a function that may communicate with the camera 100 through the network 170. As an example, a control signal, an instruction, and the like, provided under the control of the processor 330 of the video reception/search apparatus 300 may be transmitted to the camera 100 via the network 170 through the communication interface 350. Likewise, captured video information and/or position information generated by the camera 100 may be transmitted to the video reception/search apparatus 300 via the network 170.

The input/output interface 340 may serve to provide an interface between an input device implemented as a keyboard, a mouse, or the like, and an output device such as a display.

Referring to FIG. 5, the processor 330 of the video reception/search apparatus 300 according to an embodiment of the present disclosure may include a metadata receiver 332, a video frame receiver 334, a thumbnail image generator 336, and a GUI controller 338.

The processor 330 may be implemented to execute an instruction according to a code of an operating system and at least one program code included in the memory 310. In this case, components within the processor 330, that is, the metadata receiver 332, the video frame receiver 334, the thumbnail image generator 336, and the GUI controller 338, may separately express different functions performed by the processor 330 based on a control instruction provided by a program code stored in the video reception/search apparatus 300.

The metadata receiver 332 is a functional block corresponding to the metadata generator 142, which is a functional block within the processor 140 of the camera 100 described above with reference to FIG. 3, and may perform a function of receiving the metadata generated and transmitted by the metadata generator 142.

The metadata may include object detection information (movement, sound, intrusion into a designated zone, etc.), object identification information (a person, a vehicle, a face, a hat, clothes, etc.), unique identifier information of an object for object tracking, position information (coordinates, a size, etc.) of the detected object, and time information, captured in a surveillance area where an event occurs when the event occurs for each channel among surveillance videos captured in a surveillance area for each channel of each camera.

The video frame receiver 334 is a functional block corresponding to the video frame generator 144, which is a functional block within the processor 140 of the camera 100 described above with reference to FIG. 3, and may perform a function of receiving the video frame generated and transmitted by the video frame generator 144. As an example, the video frame may be generated by cropping a specific area of video data determined to be an identifiable object among the video data of the surveillance area detected in a specific area and during a specific period. The video frame may be a video frame generated by cropping a specific area, that is, a video portion corresponding to an identifiable object detected within the surveillance area, among the video analysis information corresponding to the surveillance area, created as the metadata. That is, a "best shot" video frame that may best recognize a specific object among the video data captured in the surveillance area may be selected.

The thumbnail image generator 336 may perform a function of generating a thumbnail image using the video frame received through the video frame receiver 334. The thumbnail image may be generated by utilizing an image that may best represent the occurrence of an event when the event occurs, that is, the "best shot" video frame, among the video information corresponding to the surveillance area transmitted for each channel, and the user may search for event information for each channel displayed as the thumbnail image in the video search viewer described above.

According to an embodiment of the disclosure, the thumbnail image generated by the thumbnail image generator 336 may be displayed on a timeline interface of the video search viewer displaying the received video for each channel.

The GUI controller 338 may perform an operation of controlling the timeline interface to display the respective thumbnail images at unequal intervals so as to correspond with points in time when specific events of the received videos for each channel corresponding to the thumbnail images occur, in the timeline interface, which may include a thumbnail image display and a time axis.

Through a function of the timeline interface according to an embodiment of the present disclosure as described above, the user may quickly find an event.

In addition, important events and thumbnail images corresponding to the importance events are displayed so as to correspond to a time axis of a timeline, corresponding to points in time when the thumbnails are generated, such that the user may grasp characteristics of events occurring for each channel over time, and accordingly, may easily search for event information for each channel.

Hereinafter, an operation of a video search viewer according to an embodiment of the present disclosure will be described in more detail with reference to FIGS. 6 to 13.

Figure 6:
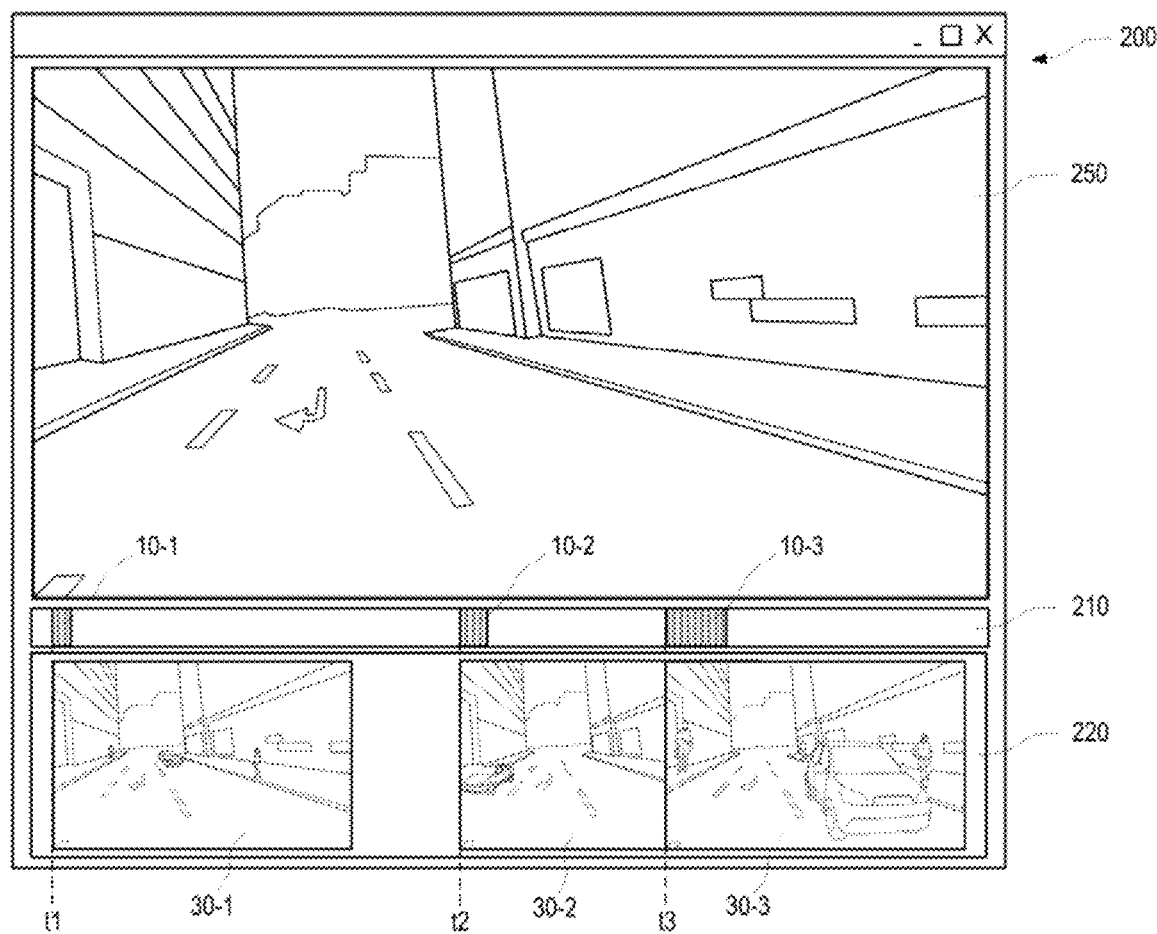
FIG. 6 is a diagram illustrating a graphic user interface (GUI) displayed by a video search viewer provided by the video reception/search apparatus according to an embodiment of the present disclosure.

FIG. 6 is a diagram illustrating a GUI 200 displayed by a video search viewer provided by the video reception/search apparatus according to an embodiment of the present disclosure.

In the GUI 200 of the video search viewer, a received video frame 250 corresponding to each channel may be displayed. FIG. 6 illustrates one video frame 250 being displayed, but the present disclosure is not limited thereto, and a plurality of channel video frames may be displayed in a predetermined arrangement, such as in a matrix form.

In addition, the video search viewer according to an embodiment of the present disclosure may include a timeline interface 210. The timeline interface 210 according to an embodiment of the present disclosure may include markers 10: 10-1, 10-2, and 10-3 indicating relative positions of video frames having events over time. Accordingly, the user may confirm contents of a received video frame of a specific channel over time through the timeline interface 210 displayed at a lower end portion of the GUI 200 of the video search viewer.

In addition, a thumbnail area 220 may be displayed adjacent to the timeline interface 210, for example, below the timeline interface 210. In this case, the plurality of thumbnail images 30: 30-1, 30-2, and 30-3 may be disposed synchronously with the plurality of markers 10-1, 10-2, and 10-3 in the thumbnail area 220.

The thumbnail area 220 may display the thumbnail images 30 associated with specific events so as to correspond to points in time when the specific events occur among received video information of the selected channel, and the thumbnail images 30 may be implemented as thumbnail images generated by the thumbnail image generator 336 described above with reference to FIG. 5.

In addition, in an embodiment of the present disclosure, the generated thumbnail images 30 may be displayed to correspond to the markers 10 of the timeline interface 210 corresponding to event occurrence points in time of the respective thumbnail images. As an example, a first thumbnail image 30-1 may correspond to a channel video captured at an earlier point in time than second and third thumbnail images 30-2 and 30-3.

As illustrated in FIG. 5, the plurality of thumbnail images 30 may be displayed at unequal intervals so as correspond to points in time when specific events of received videos of the selected channel occur. Accordingly, the thumbnail images at the unequal intervals, in which only main scenes corresponding to specific main events among the received video information of the selected channel are picked out, may be displayed, and thus, unnecessary information displayed on the GUI 200 may be minimized.

In addition, the user may confirm an occurrence frequency and occurrence points in time of the main events through functions of the timeline interface 210 and the thumbnail area 220 according to an embodiment of the present disclosure, and thus, may easily and quickly search for an event.

Such a thumbnail image 30 may enable the user to intuitively confirm the event, and when the user performs a mouse-over or click operation on the corresponding thumbnail image 30, the video frame 250 may be reproduced during an event occurrence period of the thumbnail image 30.

Operations performed by such a video reception/search apparatus 300 are summarized as follows.

First, the video frame receiver 334 provided in the processor 330 of the video reception/search apparatus 300 may receive a video including a plurality of video frames from the camera 100. Next, the metadata receiver 332 may identify a plurality of video frames in which events occur from the received video. In addition, the thumbnail image generator 336 may generate the plurality of thumbnail images 30 representing the plurality of video frames from the video frames. Thereafter, the GUI controller 338 may display the timeline interface 210 indicating occurrence times of the events by the plurality of markers 10 on a screen, and at the same time, display the plurality of thumbnail images 30 in the thumbnail area 220 adjacent to the timeline interface 210.

In this case, in the present disclosure as illustrated in FIG. 6, the markers 10 of the timeline interface 210 and the thumbnail images 30 corresponding to the markers 10 may be displayed synchronously with each other. Left ends of the markers 10 and left ends of the thumbnail images 30 may be disposed to coincide with each other.

For example, a left end of the marker 10-1 may represent a first time t1 at which an event starts, and a left end of the thumbnail image 30-1 may also be placed at a position coinciding with the first time t1. Such a rule may also apply to other thumbnail images and markers. Left ends of the thumbnail image 30-2 and the marker 10-2 may be aligned with each other on the basis of a second time t2, and left ends of the thumbnail image 30-3 and the marker 10-3 may be aligned with each other on the basis of a third time t3.

When the left ends of the markers 10 and the left ends of the thumbnail images 30 coincide with each other as described above, a user may recognize occurrence points in time of the events indicated by the thumbnail images 30 without confirming the markers 10 corresponding to the thumbnail images 30 one by one.

Since the left ends of the markers 10 indicate start times of the events and right ends of the markers 10 indicate end times of the events, when right ends of the thumbnail image 30 are aligned with the right ends of the markers 10, end times of the events may also be intuitively grasped, but in this case, sizes of the thumbnail images 30 may become as small as the markers 10, such that it may be difficult to provide a function of the thumbnail images. The event may have both a start time and an end time, but a point in time when the event starts to occur may be useful information. Accordingly, in the present disclosure, by positioning the left ends of the thumbnail images 30 so as to coincide with the start times of the events, intuition regarding contents and start points in time (occurrence points in time) of the events may be more clearly accessible.

In addition, in the present disclosure, when overlap occurs between the plurality of thumbnail images 30 due to spatial constraints of the thumbnail area 220, while displaying the plurality of thumbnail images 30, a thumbnail image 30 later in time may be displayed in front of a thumbnail image 30 earlier in time.

Referring to FIG. 6, the thumbnail image 30-3 having an event that has occurred later may overlap the thumbnail image 30-2 having an event that has occurred earlier, and in this case, on the basis of time order, the latest thumbnail image 30-3 may be displayed on an upper layer, that is, on a front surface of the screen. Such a disposition of the thumbnail images may provide characteristics that more attention may be paid to a new event.

Figure 7:
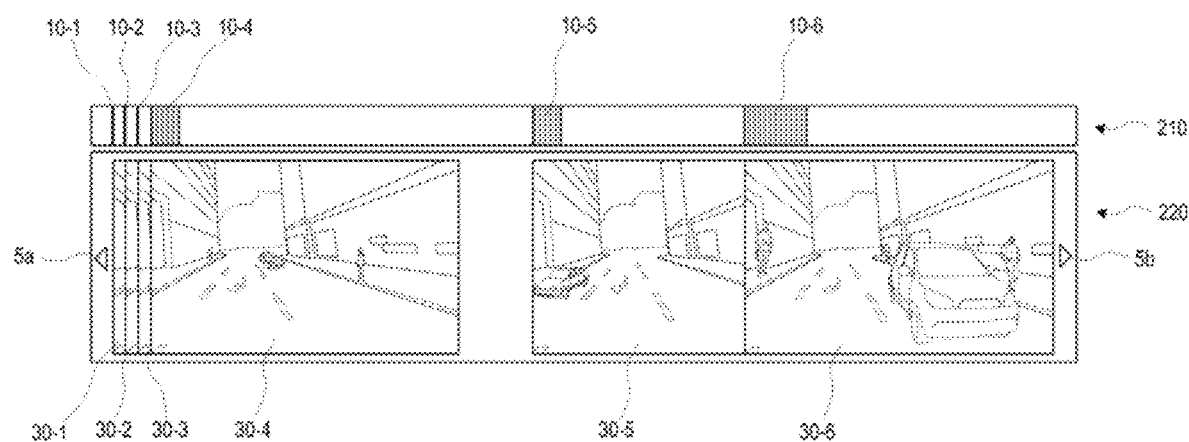
FIG. 7 is a diagram illustrating a timeline interface and a thumbnail area according to an embodiment of the present disclosure.

FIG. 7 is a diagram illustrating a timeline interface 210 and a thumbnail area 220 according to an embodiment of the present disclosure.

Referring to FIG. 7, markers 10-4, 10-5, and 10-6 whose display ranges do not overlap those of other markers 10 among a plurality of markers 10 may indicate both the start times and the end time of the events, and markers 10-1, 10-2, and 10-3 whose display ranges overlap those of other markers 10 among the plurality of markers 10 may indicate only the start times.

For example, in a thumbnail image 30-1 corresponding to the marker 10-1, a thumbnail image 30-2 corresponding to the marker 10-2, and a thumbnail image 30-3 corresponding to the marker 10-3, start times of the events may be positioned quite close to each other.

Accordingly, not only the thumbnail images 30 but also the markers 10 corresponding to the thumbnail images 30 cannot but be positioned quite close to each other, and for this reason, a start time of another marker 10-2 arrives before an end time of one marker 10-1 arrives. In such a case, in order to prevent confusion, the corresponding markers 10-1, 10-2, and 10-3 may be displayed as reduced markers 10-1, 10-2, and 10-3 that indicate only the start times. Compared to general markers 10-4, 10-5, and 10-6 having a certain width, the reduced markers 10-1, 10-2, and 10-3 may displayed in the form of a line having a narrow width.

A left end and a right end of the thumbnail area 220 may include additional thumbnail images 30 in different time zones from the plurality of thumbnail images 30 that are displayed. Accordingly, scroll indicators 5a and 5b may be displayed at the left end and the right end of the thumbnail area 220 and/or the timeline interface 210, respectively. When the user selects one of the scroll indicators 5a and 5b, thumbnail images and markers in a different time zone may be displayed while a screen is scrolling in a direction in which the scroll indicator is selected.

Figure 8:
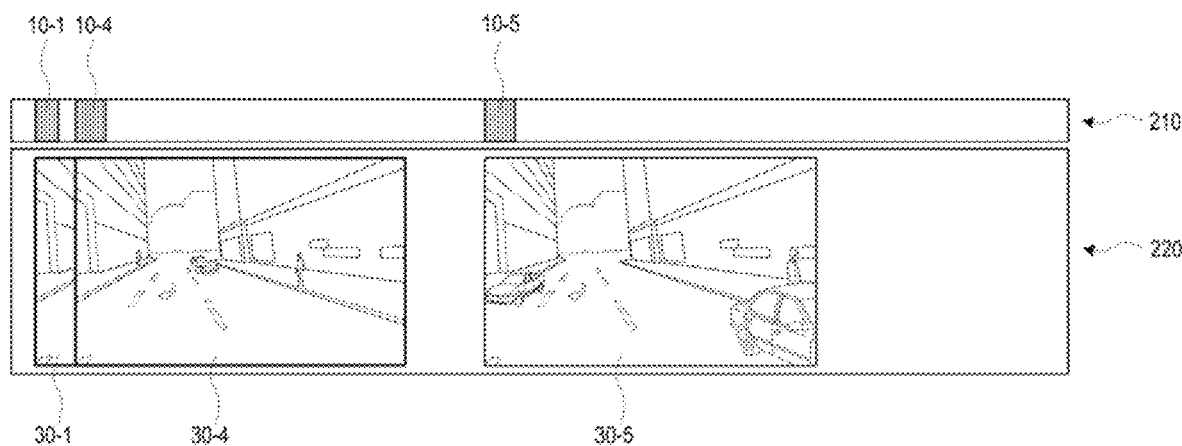
FIG. 8 is a diagram illustrating markers and thumbnail images filtered by a user in FIG. 7 according to an embodiment of the present disclosure.

FIG. 8 is a diagram illustrating markers 10 and thumbnail images 30 filtered by a user in FIG. 7.

When a user command is input in a state in which the plurality of thumbnail images 30 are displayed in the thumbnail area 220 as described above with reference to FIG. 7, a thumbnail image 30 corresponding to the user command may be selected and displayed in the thumbnail area 220. In this case, the selected thumbnail image 30 may be displayed in a manner distinguished from the plurality of thumbnail images 30. The distinguished manner may include various manners such as a manner of displaying a thick border line, a manner of displaying a border line of a different color, and a manner of displaying a highlight.

For example, when first, fourth, and fifth thumbnail images 30-1, 30-4, and 30-5 of six thumbnail images 30-1 to 30-6 in FIG. 7 are selected, the selected thumbnail images 30-1, 30-4 and 30-5 and corresponding markers 10-1, 10-4, and 10-5 corresponding to the selected thumbnail images 30-1, 30-4 and 30-5 are displayed on the GUI 200.

In this case, the user command may be a user input in which the user directly selects some of the thumbnail images 30 through, for example, a mouse or a touch screen or be an event search command of the user.

In the former case, only the thumbnail images 30 selected by the user will be displayed in the thumbnail area 220, and in the latter case, only the thumbnail images 30 corresponding to the event search command among the plurality of thumbnail images 30 will be displayed in the thumbnail area 220. In either case, left ends of the selected thumbnail images 30 are displayed to coincide with left ends of the markers 10 corresponding to the selected thumbnail images 30.

Figure 9:
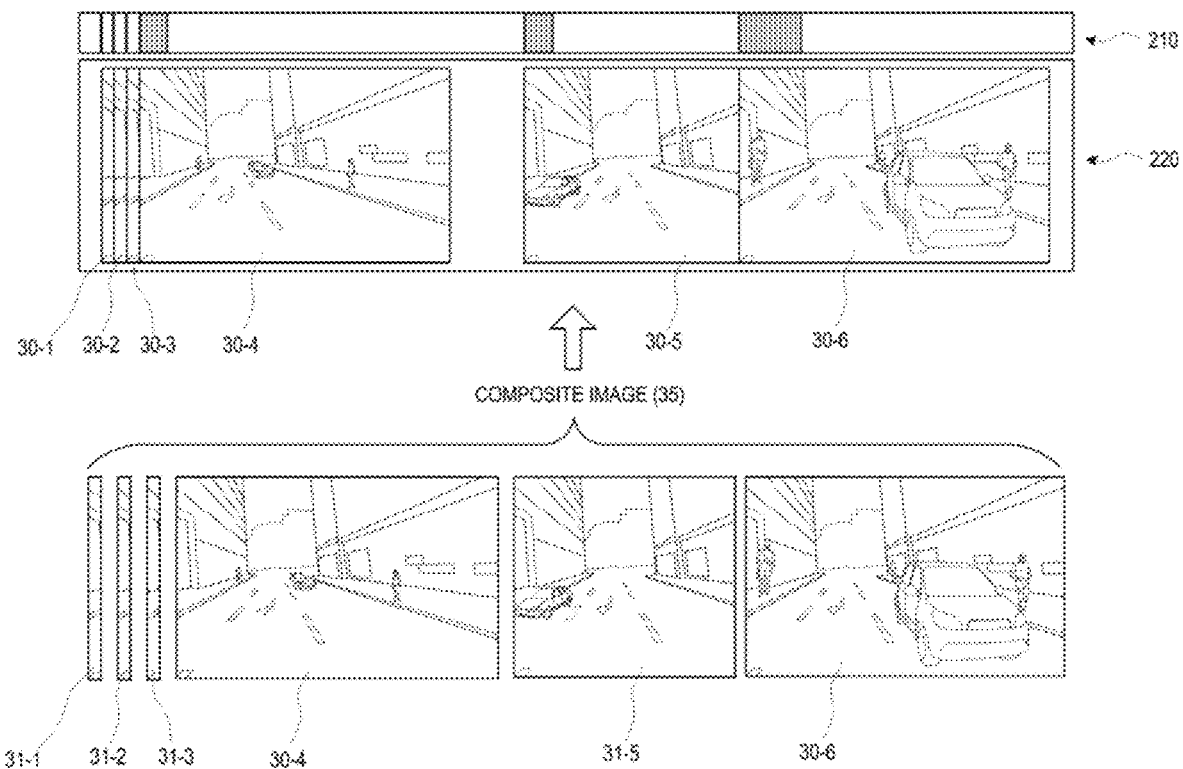
FIG. 9 is a diagram illustrating a method of generating a thumbnail image displayed in the thumbnail area according to an embodiment of the present disclosure.

FIG. 9 is a diagram illustrating a method of generating a thumbnail image 30 displayed in the thumbnail area 220.

In general, the thumbnail images 30 displayed on the GUI 200 are loaded into the memory, and the thumbnail area 220 is filled with a combination of such thumbnail images 30. However some of the plurality of thumbnail images 30 may be hidden and only partially viewed, rather than being intactly viewed on a screen. However, even in this case, the entire thumbnail images 30 are loaded into the memory, and thus, memory or system resources may be wasted.

In consideration of such a case, according to an embodiment of the present disclosure, the thumbnail image generator 336 may generate the thumbnail images 30 disposed in the thumbnail area 220 on the basis of an actual displayed result.

The thumbnail image generator 336 may crop partial images 31: 31-1, 31-2, 31-3, and 31-5 viewed to the user from the plurality of thumbnail images 30, and generate a single composite image 35 by synthesizing the partial images 31 with each other. Ultimately, such a single composite image 35 may be displayed on the thumbnail area 220.

Referring to FIG. 9, for example, first to third thumbnail images 30-1, 30-2, and 30-3 and the fifth thumbnail image 30-5 are actually hidden and only partially appear on the GUI 200. Therefore, the thumbnail image generator 336 may generate only partial images 31-1, 31-2, 31-3, and 31-5 for these thumbnail images and generate a composite image 35 by sequentially synthesizing these partial images 31-1, 31-2, 31-3, and 31-5 and other intact thumbnail images 30-4 and 30-6, and the GUI controller 338 may display the composite image 35 in the thumbnail area 220.

Figure 10:
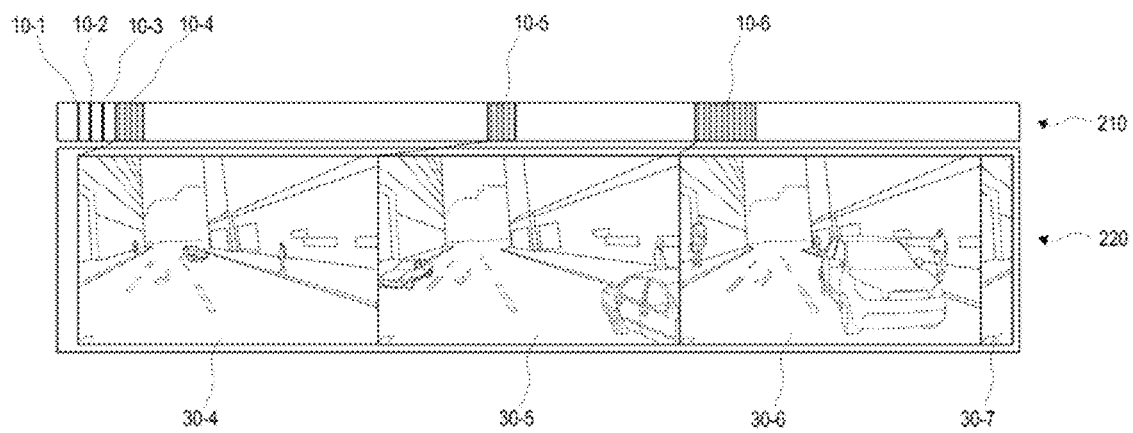
FIG. 10 is a diagram illustrating an example in which the thumbnail images are filled in the thumbnail area without a blank according to an embodiment of the present disclosure.

FIG. 10 is a diagram illustrating an example in which the thumbnail images 30 are filled in the thumbnail area 220 without a blank.

When the thumbnail images 30 are displayed in synchronization with the times as described above, there may be an advantage that the start times of the events may be intuitively recognized, but there may also be a disadvantage that a significant portion of the entire thumbnail area 220 may remain blank.

In consideration of such a disadvantage, as illustrated in FIG. 10, thumbnail images 30-4, 30-5, 30-6, and 30-7 may be filled in the thumbnail area 220 without a blank. In this case, the plurality of thumbnail images 30 displayed in the thumbnail area 220 may have the same size in a transverse direction and be displayed side by side in time order.

In this case, the time order of the thumbnail images 30 is maintained, but the start times of the events may not be recognized. Therefore, in order to recognize the start times of the events, markers 10-4, 10-5, and 10-6 of the timeline interface 210 above the thumbnail images 30 may be referenced. Left ends of the marker 10-4, 10-5, and 10-6 and left ends of the thumbnail image 30-4, 30-5, and 30-6 corresponding thereto may be disposed to be connected to each other with guide lines (e.g., dotted lines).

In FIG. 10, the display of thumbnail images 30-1, 30-2, and 30-3 has been omitted. In this way, in order to display the plurality of thumbnail images 30 in the limited thumbnail area 220, the display of thumbnail images 30 whose start times of the events overlap each other within a time range smaller than a predetermined time, on the thumbnail area 220 may be omitted.

Figure 11A:
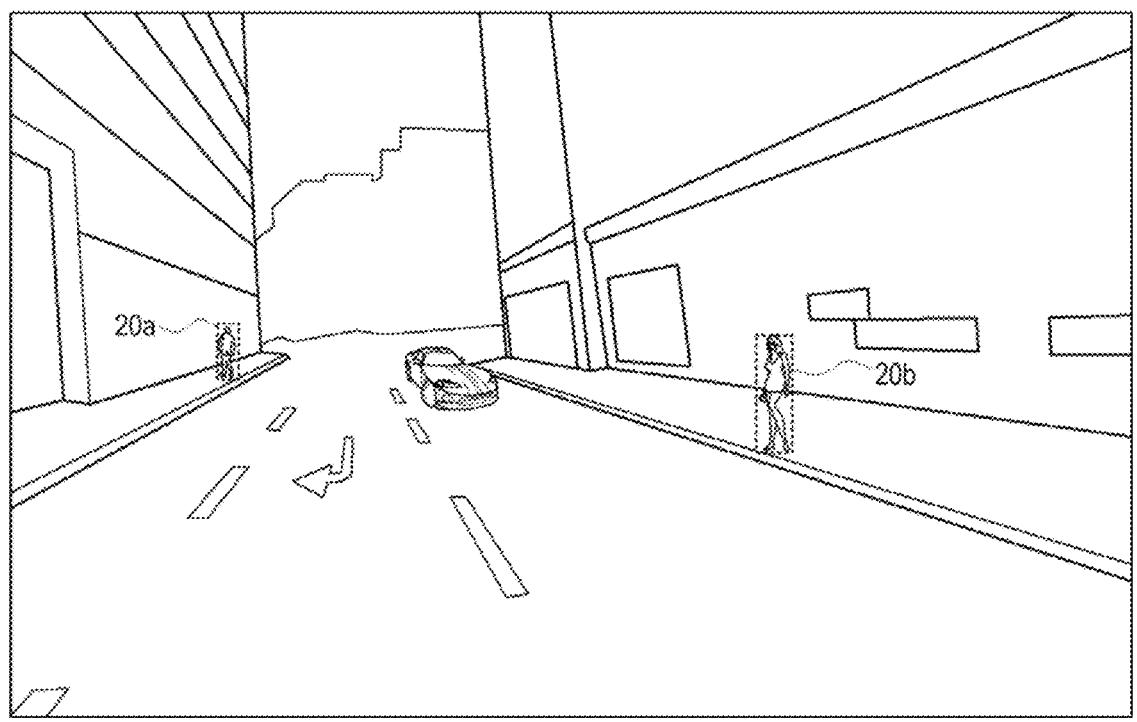
FIG. 11A is a diagram illustrating an example of extracting a bounding box of an object related to an event within a video frame according to an embodiment of the disclosure.
Figure 11B:
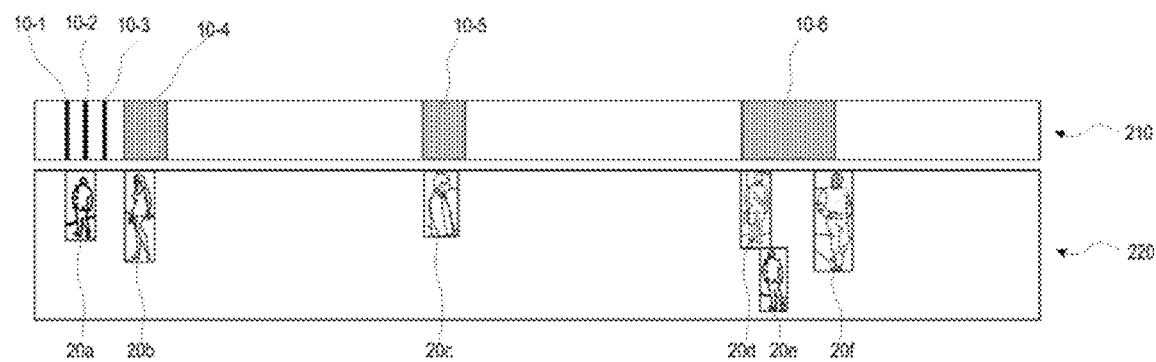
FIG. 11B is a diagram illustrating an example of displaying the extracted object in the thumbnail area according to an embodiment of the present disclosure.

FIG. 11A is a diagram illustrating an example of extracting a bounding box of an object 20 related to an event within a video frame 250, and FIG. 11B is a diagram illustrating an example of displaying the extracted object 20 in the thumbnail area 220.

By modifying an embodiment of generating the thumbnail image 30 for the entire video frame in which the event has occurred and displaying the thumbnail image 30 in the thumbnail area 220 as described above, a best shot within the video frame instead of the video frame may be cropped and displayed in the thumbnail area 220. The best shot may refer to an area of an object where a specific event occurs within the entire video frame. An area 20 of such an object may be defined as a rectangular box generally called a bounding box.

When a user command (e.g., a best shot display command) is received, the thumbnail image generator 336 may crop best shots 20: 20a and 20b included in the plurality of thumbnail images 30 from the plurality of thumbnail images 30 according to the user command (see FIG. 11A). In addition, the GUI controller 338 may display the cropped best shots in the thumbnail area 220 instead of the plurality of thumbnail images 30 (see FIG. 11B).

Also in FIG. 11B, the cropped best shots 20a to 20f may be displayed synchronously with the plurality of markers 10. However, in some cases, start times of the best shots 20 may be close to each other, such that overlap may occur between the best shots 20. For example, start times of the best shot 20d and the best shot 20e may be close to each other, and may be difficult to display the best shot 20d and the best shot 20e side by side. Accordingly, in this case, the best shot 20e that has occurred later may be displayed at a lower level than the best shot 20d that has occurred earlier. Since such best shots 20 are smaller image areas than the thumbnail images 30, the best shots 20 may be identified by the user even though the best shots are divided and displayed at upper and lower levels as described above.

Figure 12A:
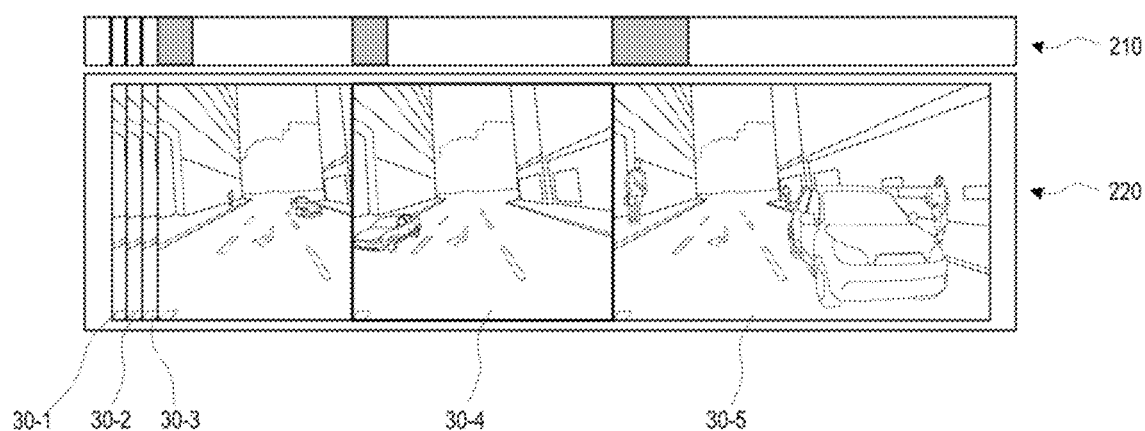
FIG. 12A is a diagram illustrating an example in which a user selects one of thumbnail images displayed in the thumbnail area according to an embodiment of the present disclosure.
Figure 12B:
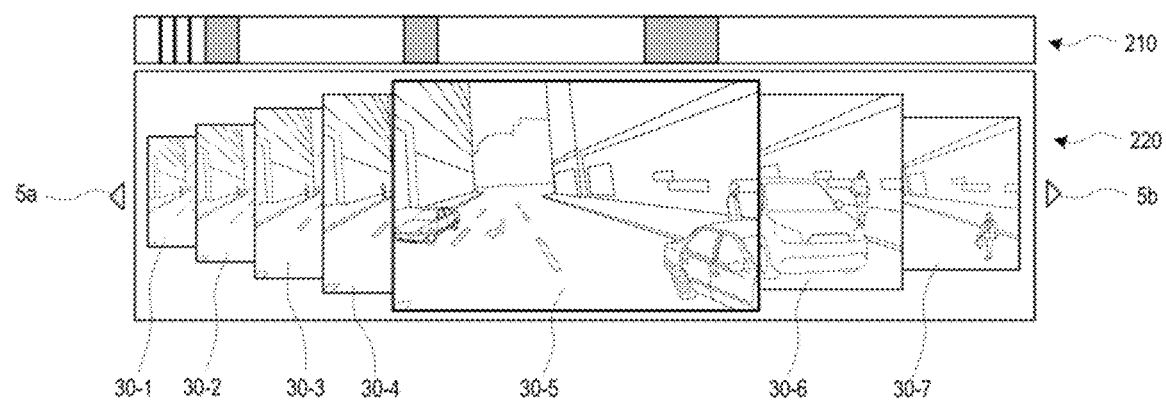
FIG. 12B is a diagram illustrating an example of displaying surrounding thumbnail images in a carousel form on the basis of the thumbnail image selected in FIG. 12A according to an embodiment of the present disclosure.

FIG. 12A is a diagram illustrating an example in which a user selects one of thumbnail images 30 displayed in the thumbnail area 220, and FIG. 12B is a diagram illustrating an example of displaying surrounding thumbnail images 30 in a carousel form on the basis of the thumbnail image 30 selected in FIG. 12A.

For example, when the user selects any one 30-4 of the thumbnail images 30-1, 30-2, 30-3, 30-4, and 30-5 displayed as illustrated in FIG. 12A, the selected thumbnail image 30-4 may be displayed as a highlight.

Thereafter, on the basis of the selected thumbnail image 30-5, the other thumbnail images 30-1, 30-2, 30-3, 30-4, 30-6, and 30-7 may be displayed in a carousel form on the left and the right of the one thumbnail image 30. In this case, the thumbnail images 30-1, 30-2, 30-3, and 30-4 disposed on the left may include images earlier than the selected thumbnail image 30-5 in time, and the thumbnail images 30-6 and 30-7 disposed on the right may include images later than the selected thumbnail image 30-5 in time.

Such a carousel form refers to a manner in which thumbnail images are displayed to gradually become smaller from the center, and are rotatable in left and right directions by the scroll indicators 5a and 5b. When the user selects the scroll indicator 5b on the right, the thumbnail image 36-6 may be positioned at the center, and a thumbnail image later than the thumbnail image 36-7 in time may be additionally displayed on the right side of the thumbnail image 36-7.

Figure 13:
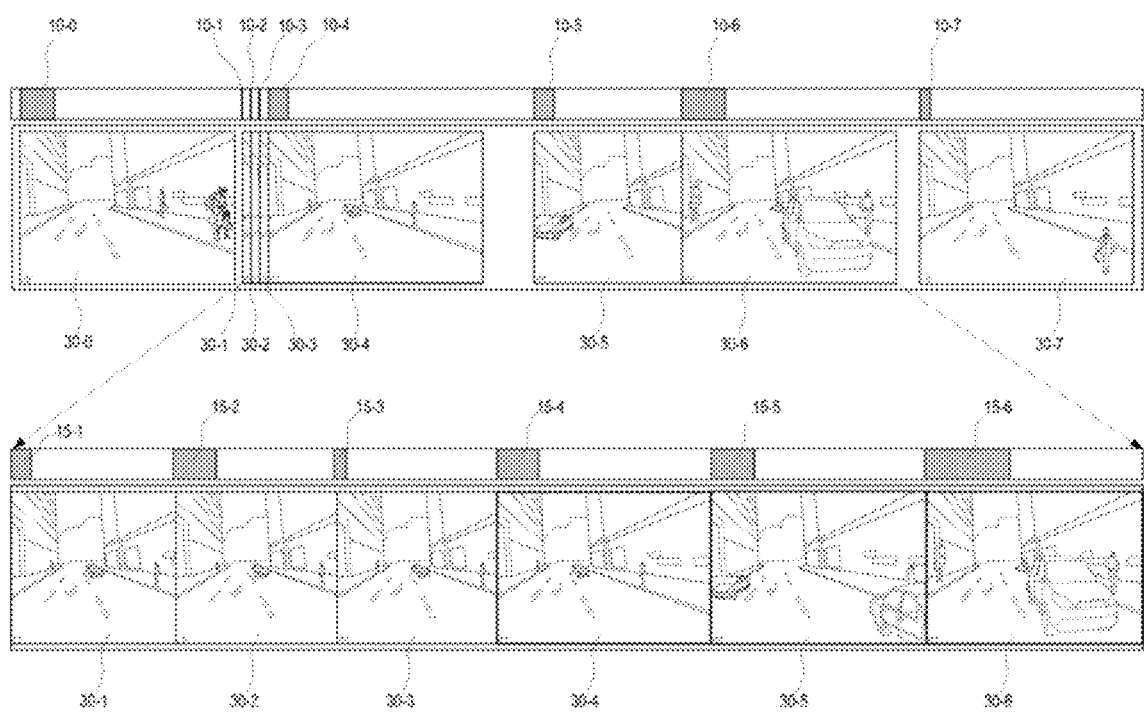
FIG. 13 is a diagram illustrating an example of enlarging and displaying a partial area of the thumbnail area designated by the user.

FIG. 13 is a diagram illustrating an example of enlarging and displaying a partial area of the thumbnail area 220 designated by the user.

The processor 330 may receive a user command designating a partial area (e.g., an area including 30-1 to 30-6) of the thumbnail area 220. In this case, the processor 330 may dispose thumbnail images 30 included in the designate partial area so that the thumbnail images 30 included in the designated partial area among the plurality of thumbnail images 30 cover the entire thumbnail area 220, according to the user command. At the same time, the markers 10 displayed in the timeline interface 210 may be changed into markers 15: 15-1, 15-2, 15-3, 15-4, 15-5, and 15-6 whose widths are increased by the enlarged ratio.

Some thumbnail images 30-4, 30-5, and 30-6 of the thumbnail images 30-1 to 30-6 included in the designated partial area may be displayed in the form of intact images (e.g., unaltered), and the other thumbnail images 30-1, 30-2, and 30-3 of the thumbnail images 30 may be displayed in the form of cropped images. The selection of the form of intact images and the form of cropped images as described above may be changed depending on the number of thumbnail images 30 disposed in the thumbnail area 220. However, when all thumbnail images 30 may not be displayed in the form of intact images, some of all thumbnail images 30 cannot but be displayed in the form of cropped images. The thumbnail images 30-1, 30-2, and 30-3 displayed in the form of cropped images as described above may be thumbnail images whose start times of the corresponding events are relatively close to each other within a predetermined range.

Unlike existing systems, by providing video frames of an identifiable specific area among video analysis information for a surveillance area, a client such as a video reception/search apparatus (e.g., video analyzer) may more quickly search for video data of the surveillance area using the image information without performing a separate video decoding procedure.

In addition, according to an embodiment of the present disclosure, the system and method allow for an efficient search by receiving surveillance videos for each channel transmitted from a plurality of network cameras and video analysis information corresponding to the surveillance videos, and displaying thumbnail images corresponding to event highlights of the received videos for each channel at unequal intervals on a timeline of a video search viewer displaying the received videos for each channel.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A video display method performed by a processor and a memory storing instructions executable by the processor, the video display method comprising:
receiving video data from at least one camera;
identifying a plurality of video frames in which events occur from the received video data;
generating a plurality of thumbnail images respectively representing the plurality of video frames;
displaying a timeline interface indicating respective times of the events via a plurality of markers; and
providing the plurality of thumbnail images in a thumbnail area adjacent to the timeline interface respectively corresponding with the plurality of markers,
wherein the thumbnail area and the timeline interface extend in parallel to each other in a first direction, the plurality of thumbnail images are arranged in the thumbnail area in chronological order, and the plurality of markers corresponding to the respective thumbnail images are arranged in the timeline interface,
wherein a left end of each thumbnail image is aligned, with respect to a second direction, with a left end of each corresponding marker, respectively, and the left end of each corresponding marker indicates a start time of each event within the timeline interface, respectively, and
wherein the first direction and the second direction are orthogonal to each other.

2. The video display method of claim 1, wherein a marker which does not overlap another marker indicates a start time and an end time of an event, and
wherein a marker which overlaps another marker indicates a start time.

3. The video display method of claim 2, wherein the thumbnail area comprises a scroll indicator at a left end and a right end configured to display thumbnail images from different time zones than thumbnail images that are displayed in the thumbnail area.

4. The video display method of claim 1, wherein based on multiple thumbnail images of the plurality of thumbnail images overlapping in the thumbnail area, a thumbnail image captured later in time is displayed in front of a thumbnail image captured earlier in time.

5. The video display method of claim 1, further comprising:
receiving a user command which selects a thumbnail image among the plurality of thumbnail images displayed in the thumbnail area; and
displaying the selected thumbnail image in the thumbnail area.

6. The video display method of claim 5, wherein the selected thumbnail image is distinguished from the plurality of thumbnail images.

7. The video display method of claim 5, wherein the user command comprises an event search among the video data, and one or more thumbnail images corresponding to the event search among the plurality of thumbnail images are displayed in the thumbnail area, and
wherein left ends of the one or more thumbnail images coincide with left ends of one or more markers corresponding to the one or more thumbnail images.

8. The video display method of claim 1, wherein the providing the plurality of thumbnail images in the thumbnail area comprises:
cropping partial images from the plurality of thumbnail images; and
generating a composite image by combining the partial images and providing the composite image in the thumbnail area.

9. The video display method of claim 1, wherein the plurality of thumbnail images provided in the thumbnail area have a same size in a transverse direction and are provided in the chronological order.

10. The video display method of claim 1, further comprising:
receiving a user command;
cropping partial images based on one or more objects included in the plurality of thumbnail images according to the user command; and
displaying the partial images as the plurality of thumbnail images in the thumbnail area.

11. The video display method of claim 1, wherein the plurality of thumbnail images are displayed in a carousel form on a left and a right of a thumbnail image provided in the thumbnail area.

12. The video display method of claim 1, further comprising:
receiving a user command selecting a partial area of the thumbnail area; and
displaying thumbnail images included in the selected partial area in the thumbnail area.

13. The video display method of claim 12, wherein, based on the thumbnail images included in the selected partial area, one or more thumbnail images are displayed as uncropped images and one or more thumbnail images are displayed as cropped images.

14. A video processing system comprising:
at least one camera configured to obtain video data;
a display interface; and
a video analyzer comprising a memory storing instructions, and a processor configured to execute the instructions to:
receive the video data from the at least one camera;
identify a plurality of video frames in which events occur from the received video data;
generate a plurality of thumbnail images respectively representing the plurality of video frames;
display a timeline interface indicating respective times of the events via a plurality of markers; and
provide the plurality of thumbnail images in a thumbnail area adjacent to the timeline interface respectively corresponding with the plurality of markers,
wherein the thumbnail area and the timeline interface extend in parallel to each other in a first direction, the plurality of thumbnail images are arranged in the thumbnail area in chronological order, and the plurality of markers corresponding to the respective thumbnail images are arranged in the timeline interface,
wherein a left end of each thumbnail image is aligned, with respect to a second direction, with a left end of each corresponding marker, respectively, and the left end of each corresponding marker indicates a start time of each event within the timeline interface, respectively, and
wherein the first direction and the second direction are orthogonal to each other.

15. The video processing system of claim 14, wherein the thumbnail area comprises scroll indicators at respective ends configured to display thumbnail images from different time zones than a plurality of thumbnail images that are displayed in the thumbnail area.

16. The video processing system of claim 14, wherein the processor is further configured to:

receive a user command which selects a thumbnail image among the plurality of thumbnail images displayed in the thumbnail area; and display the selected thumbnail image in the thumbnail area.

17. The video processing system of claim 14, wherein the processor is further configured to:

crop partial images based on one or more objects included in the plurality of thumbnail images based on the video data; and display the partial images as the plurality of thumbnail images in the thumbnail area.

18. The video processing system of claim 14, wherein the video data comprises video information and associated metadata, wherein the video information comprises the plurality of video frames, and wherein the associated metadata comprises:
object detection information;
object tracking information;
object position information; and
time information.

19. The video processing system of claim 17, wherein the processor is further configured to:

receive a user command which selects a thumbnail image among the plurality of thumbnail images displayed in the thumbnail area; and display the selected thumbnail image in the thumbnail area, and wherein the user command is an event search among the video data, and one or more thumbnail images corresponding to the event search among the plurality of thumbnail images are displayed in the thumbnail area.

20. A non-transitory computer-readable information storage medium for storing a program for causing a computer to:

receive video data from at least one camera;

identify a plurality of video frames in which events occur from the received video data;

generate a plurality of thumbnail images respectively representing the plurality of video frames;

display a timeline interface indicating respective times of the events via a plurality of markers; and provide the plurality of thumbnail images in a thumbnail area adjacent to the timeline interface respectively corresponding with the plurality of markers, wherein the thumbnail area and the timeline interface extend in parallel to each other in a first direction, the plurality of thumbnail images are arranged in the thumbnail area in chronological order and the plurality of markers corresponding to the respective thumbnail images are arranged in the timeline interface;

wherein a left end of each thumbnail image is aligned, with respect to a second direction, with a left end of each corresponding marker, respectively, and the left end of each corresponding marker indicates a start time of each event within the timeline interface respectively, and wherein the first direction and the second direction are orthogonal to each other.

\* \* \* \* \*